UNITED STATES PATENT OFFICE.

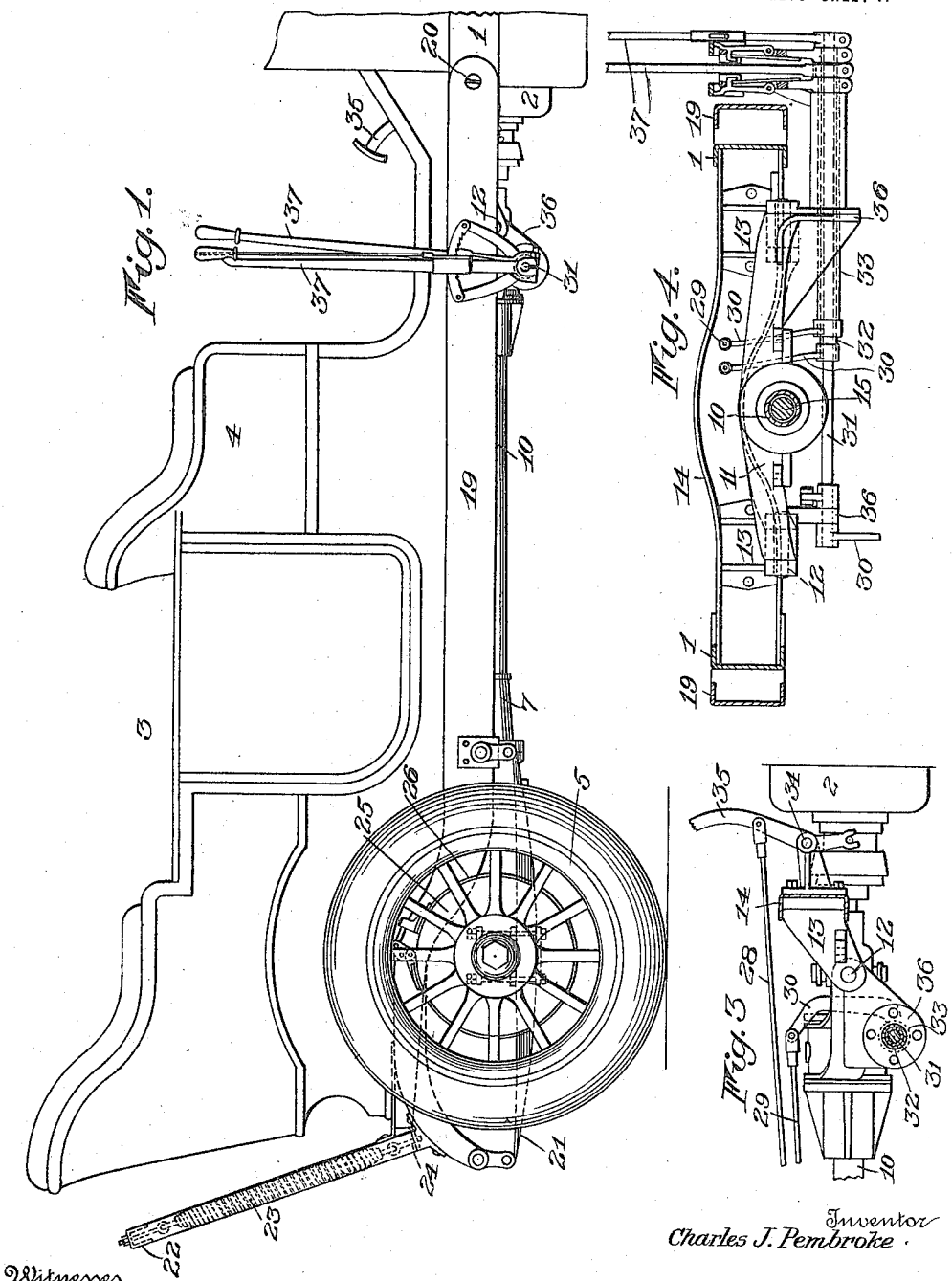

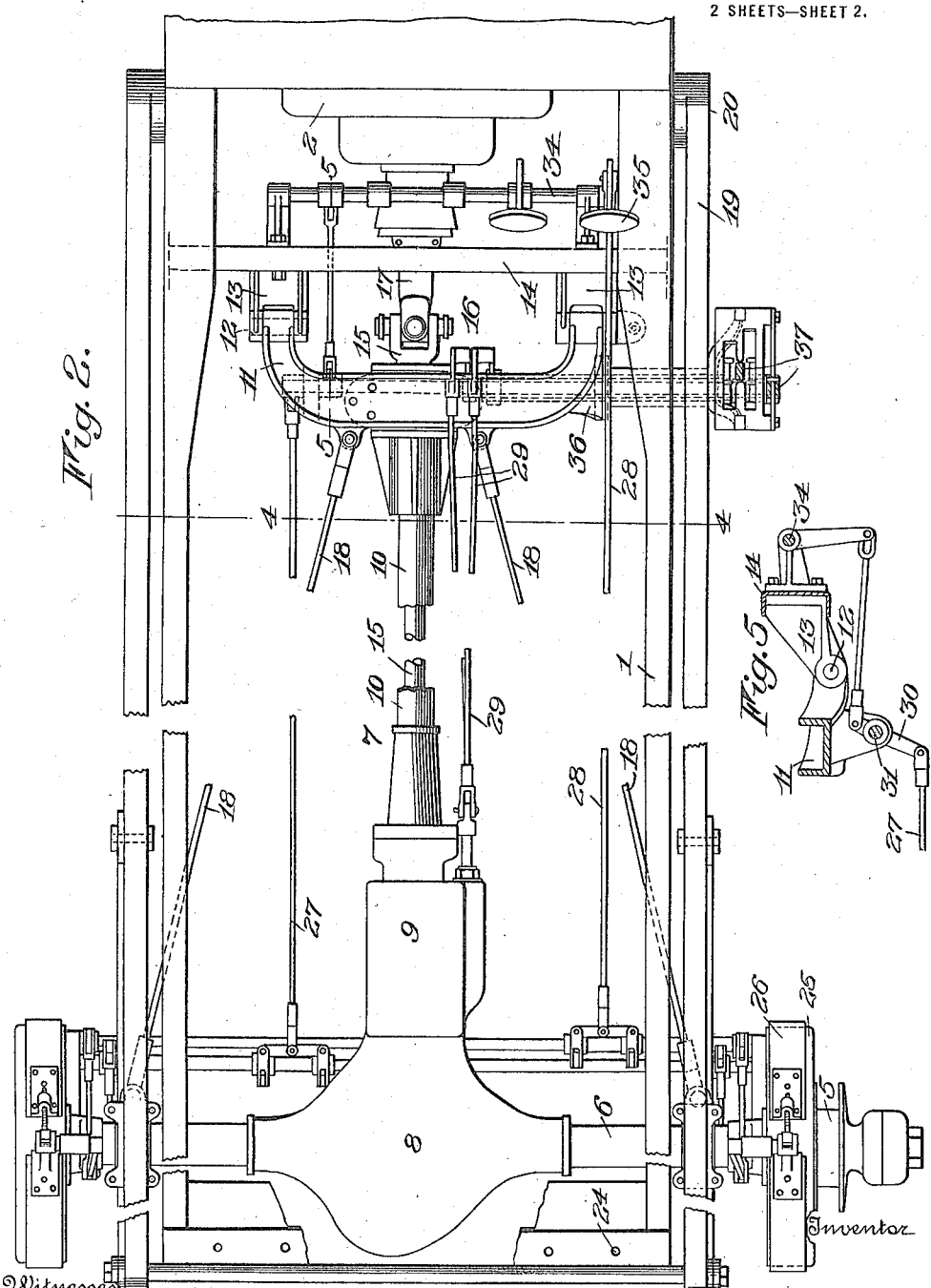

CHARLES J. PEMBROKE, OF ROCHESTER, NEW YORK.

AUTOMOBILE.

1,143,777.

Specification of Letters Patent. Patented June 22, 1915.

Application filed October 12, 1910. Serial No. 586,612.

*To all whom it may concern:*

Be it known that I, CHARLES J. PEMBROKE, of Rochester, in the county of Monroe and State of New York, have invented certain new and useful Improvements in Automobiles; and I do hereby declare the following to be a full, clear, and exact description of the same, reference being had to the accompanying drawings, forming a part of the specification, and to the reference-numerals marked thereon.

My present invention relates to self propelled vehicles and it has for its object to provide an improved construction in the matter of the arrangement of the operating levers or members that control the driving wheels through the medium of brakes or speed changing mechanism, whereby the operative connections between the latter and the levers is simplified and rendered more reliable.

A further object of the invention is to improve the manner of mounting the body of the vehicle including the driver's seat from which the above mentioned operating members are manipulated to the end that a flexible and easy riding vehicle may be produced.

To these and other ends the invention consists in certain improvements and combinations of parts, all as will be hereinafter more fully described, the novel features being pointed out in the claims at the end of the specification.

In the drawings, Figure 1 is a side elevation of a motor car constructed in accordance with and illustrating one embodiment of my invention; Fig. 2 is a top plan view of the chassis; Fig. 3 is a detail side elevation of the pivotal connection between the wheel supporting member and the main frame; Fig. 4 is a transverse section on the line 4—4 of Fig. 2, and Fig. 5 is a detail section on the line 5—5 of Fig. 2.

Similar reference numerals in the several figures indicate similar parts.

The motor car illustrated in the present embodiment of the invention comprises a preferably rigid main frame 1 which may be of the usual, or any preferred construction, on the forward end of which is mounted the motor, indicated generally by 2, while the body 3 is mounted on and covers the central and rear portions of the frame and comprises a substantially centrally arranged driver's seat 4.

The rear or driving wheels 5 of the vehicle are of the usual type being provided with axles (not shown in detail) that turn in axle casings 6 carried on a wheel supporting member, indicated generally, in Fig. 2, by reference numeral 7. This supporting member 7 is a rigid T-shaped structure, which, in the present instance, is made up of the casing 8 for the differential with which the axle tubes 6 are joined, the speed changing gear case 9 and the main driving shaft casing 10, which latter extends forwardly and terminates in a yoke 11 that is pivoted at 12 to depending brackets or hangers 13 fastened to a cross bar 14 that spans the main frame 1 in rear of the motor. The main drive shaft 15 operates the wheels in the usual manner and the forward end thereof projects between the arms of the yoke and is connected by a universal joint 16 with the motor shaft 17. The rigidity of the supporting member 7 as a whole is reinforced by strut rods 18 connecting the yoke 11 with the outer ends of the axle tubes 6.

A supplemental frame 19 is pivoted to the main frame 1 at the forward point 20 in front of the driver's seat 4 and interposed between the rear end of this frame and the wheel supporting member 7, so that the wheels take the weight of the frame, are springs 21. Rising from the rear end of the supplemental frame, also, is a standard 22 and suspended from the upper end of the standard is an extensible spring 23 the lower end of which supports the rear end of the main frame 1 at 24. Thus the vibrations of the driving wheels are taken up in part by the spring 21 or, if they are excessive, the wheels and the springs 21 oscillate with the frame 19 about the pivot 20 and such oscillations are in turn subdued before being communicated to the body 3 on the frame 1 by the spring 23 that supports the rear end of such frame on the supplemental frame 19. In this way the shocks incident to rough roads are but slightly communicated to the occupants of the body 3 and a very easy riding car is the result.

The speed of the driving wheels 5 is controlled as usual, by the change gears within the case 9 and by suitable brakes on the wheels themselves. In the present instance the wheels are provided with drums 25 having inner brake bands (not shown) and outer brake bands 26, the former of which are actuated by the rods 27 and the latter by the rod 28, but the details of these controlling mechanisms are not important to the present invention. The change gears are actuated by rods 29 and all of the rods are connected, as by the arm 30, shown in Fig. 5, with a plurality of concentric shafts 31, 32, 33, with the exception in the present instance of the rod 28 for the outside brake which has a separate shaft 34 and treadle 35. These shafts are journaled in brackets 36 on the wheel supporting member 7, or rather its yoke 11, in rear of the pivot 12 and consequently they move with the member 7 relatively to both frames and the swaying and bouncing of the vehicle does not, therefore, affect in the least the relation of these shafts with the parts they control, nor necessitate the provision of a sliding or otherwise yielding connection between these elements.

Affixed to each shaft, on the outer end thereof, is a controlling lever 37 which extends upwardly in proximity to and accessible from the driver's seat 4, as usual, and while these levers have a vibratory movement relatively to the seat it is very slight on account of the close proximity of the shafts 31, 32 and 33 to the pivotal center 12.

I claim as my invention.

1. In a self propelled vehicle, the combination with a main frame, a motor thereon, driving wheels for the vehicle, a supporting member for the wheels pivoted to the main frame and permitting relative movement between the latter and the wheels, springs interposed between the supporting member and the main frame, and driving mechanism between the wheels and motor, of a speed controlling device for the wheels carried with the wheel supporting member and operating means for said device comprising a laterally projecting shaft journalled in the wheel supporting member, and a hand lever mounted thereon to project above the frame.

2. In a self propelled vehicle, the combination with a main frame and a motor and a driver's seat mounted thereon, of a supplemental frame pivoted to the main frame, a spring interposed between the frames, driving wheels for the vehicle, a supporting member therefor pivoted to the main frame, a spring interposed between the supporting member and the supplemental frame, driving mechanism between the wheels and motor, a speed controlling device for the wheels movable with the wheel supporting member and an operating lever for the controlling device journaled in the supporting member to move therewith relatively to both frames and extending in accessible proximity to the driver's seat.

3. In a vehicle, the combination with a main frame, of a supplemental frame pivoted to the main frame, a spring interposed between the frames, driving wheels for the vehicle, a supporting member therefor pivoted to the main frame and a spring interposed between the supporting member and the supplemental frame.

4. In a self propelled vehicle, the combination with a main frame, of a supplemental frame pivoted to the main frame, a spring interposed between the frames, driving wheels for the vehicle, a seat on the main frame arranged intermediate the pivot of the frames and the turning axis of the wheels, a supporting member for the latter pivoted to the main frame and a spring interposed between the supporting member and the supplemental frame.

5. In a vehicle, the combination with a main seat carrying frame, of a supplemental frame pivoted at its front end to the main frame and having an upwardly projecting standard at the rear thereof from which the rear end of the main frame is yieldingly suspended, wheels supporting the supplemental frame, and springs interposed between the wheels and the latter.

CHARLES J. PEMBROKE.

Witnesses:
RUSSELL B. GRIFFITH,
NELSON COPP.

Copies of this patent may be obtained for five cents each, by addressing the "Commissioner of Patents, Washington, D. C."